United States Patent [19]

Duspiva et al.

[11] Patent Number: 4,965,712
[45] Date of Patent: Oct. 23, 1990

[54] TRANSFORMER HAVING PLURAL-TURN CORE

[75] Inventors: Walter S. Duspiva, Port Ewen; John B. Gillett, Woodstock; James H. Spreen, Stone Ridge, all of N.Y.

[73] Assignee: International Business Machines Corporation, Armonk, N.Y.

[21] Appl. No.: 226,340

[22] Filed: Jul. 29, 1989

[51] Int. Cl.[5] .................. H02M 7/06; H01F 27/24; H01F 27/30

[52] U.S. Cl. .................. 363/126; 336/175; 336/182; 336/212; 336/232

[58] Field of Search ............... 336/175, 176, 212, 232, 336/214, 215, 212, 221, 180, 182, 233; 363/17, 126

[56] References Cited

U.S. PATENT DOCUMENTS

| | | | |
|---|---|---|---|
| 895,801 | 8/1908 | Schubert | 336/175 X |
| 1,729,713 | 10/1929 | Dicke | 336/175 X |
| 1,735,092 | 1/1929 | Roller | 336/175 X |
| 2,883,622 | 4/1959 | Lenehan | 336/175 X |
| 2,916,696 | 12/1959 | Schonstedt | 336/175 |
| 4,803,609 | 2/1989 | Gillett et al. | 363/17 |

FOREIGN PATENT DOCUMENTS

| | | | |
|---|---|---|---|
| 220494 | 5/1987 | European Pat. Off. | 336/232 |
| 141959 | 5/1980 | Fed. Rep. of Germany | 336/175 |

Primary Examiner—Thomas J. Kozma
Attorney, Agent, or Firm—Robert L. Troike; George E. Clark

[57] ABSTRACT

A transformer has a multi-turn magnetic core about a loop of conductor. A bridge transformer has one turn of the core about one half of the conductor loop and a second turn of the core about the other half of the conductor loop, and an electrical center tap connection to the loop between the two halves thereof. Embedded diodes connect the ends of the loop to an external circuit.

5 Claims, 6 Drawing Sheets

TRANSFORMER HAVING PLURAL-TURN CORE

BACKGROUND OF THE INVENTION

1. Field of the Invention:

This invention relates to electrical transformers and circuits employing the same, and more particularly to transformers having a specially configured core contributing to the desired input to output transformation ratio and permitting the simplification of the associated winding structure to facilitate inclusion thereof in power inverter circuits.

2. Prior Art:

Customarily, an electrical transformer comprises a magnetic flux path defining core, and input and output windings linking the flux carried by that core, with the input to output transformation (voltage and current) being determined by the turns ratio of the input and output windings. In many cases it is desirable to have an output winding consisting of a single turn for ease of fabrication. An example is seen in high current output transformers where the secondary may be made from thick bar-like conductor material which is impractical to form into multiple turns.

Moreover, high current output secondary windings in a power transformer may generate significant heat which must be transferred to adjacent structures. For this reason it is desirable to form the secondary winding as a simple, flat structure having an abundant heat transfer surface. This cooling requirement militates against provision of plural turns in such a winding. If traditional single flux turn magnetic structures are used, this single turn secondary winding requirement places design constraints on the primary winding for a given transformation ratio objective.

There are cases in which it is necessary to provide a center tap to a transformer winding. In prior art, such a center tap has always required a multiple turn winding. A well-known example is a "bridge transformer" having a primary connected in first and opposite directions, in alternation, across a d.c. bulk voltage source, and a secondary winding having a center tap connected to one side of the load, such as ground, and winding ends connected through respective diodes to the other side of the load to supply the same in push-push fashion. In high secondary current designs, it can be difficult to make the required connections to the secondary in a manner whereby they do not interfere mechanically or electrically with each other and wherein the diodes are packaged close to the secondary winding structure. In particular, the three connections exiting together from a conventional bridge transformer make it very difficult to contain the entire diode-diode commutate current loop within the transformer.

Summary of the Invention

The above described deficiencies of the prior art are overcome, and the above described requirements of certain power transformer circuits are satisfied, by a novel transformer structure in which instead of or in addition to linking the flux provided by the primary with several secondary winding turns, that primary flux is guided by the core to link the secondary winding plural times. In the extreme, the secondary winding may have but one turn linked N times by the flux ($\phi$) induced by action of the primary, so that the voltage induced in the secondary is a direct function of $N_W(dN_F\phi/dt)$ instead of the familiar $N_W(d\phi/dt)$, where $N_W$ = number of turns of the coil and $N_F$ equals the number of turns of the flux.

Moreover, the invention provides a core and winding structure whereby the electrical center of a single plane winding (i.e. the location appropriate for a center tap connection) is defined by the turns of the core.

By providing a full bridge transformer with a single plane structure in which the center tap connection is remote from the two end connections, the invention facilitates the incorporation of the entire diode-diode commutate current loop into the transformer, allowing faster commutate times and hence higher frequency operation.

According to one aspect of the invention there is provided an inductive device, such as a transformer, which has a plural turn magnetic core about a loop of conductor. According to another aspect of the invention, there is provided a transformer comprising a primary coil, a secondary conductor loop, and a magnetic core linking the primary coil and making multiple turns through and about the secondary loop.

According to another aspect of the invention there is provided a transformer structure having core elements which comprise a two-turn core, one turn of which is about each side of a single plane, simple center tapped secondary structure having improved ease of fabrication, assembly and cooling.

Another aspect of the invention comprises provision of a primary winding linking the above-described core and energized by pulses of alternating polarity applied to the primary from a direct current bulk supply through four duty cycle controllable switches arranged in full bridge configuration, and the secondary structure including diodes at the free ends thereof connected in parallel for delivery of power to a load, and a common point at the other side of the secondary structure being a center tap for connection to the other side of the load.

Other objects and advantages of the invention will be apparent from the above and from the drawings, description and claims.

Detailed Description

Figure 1:
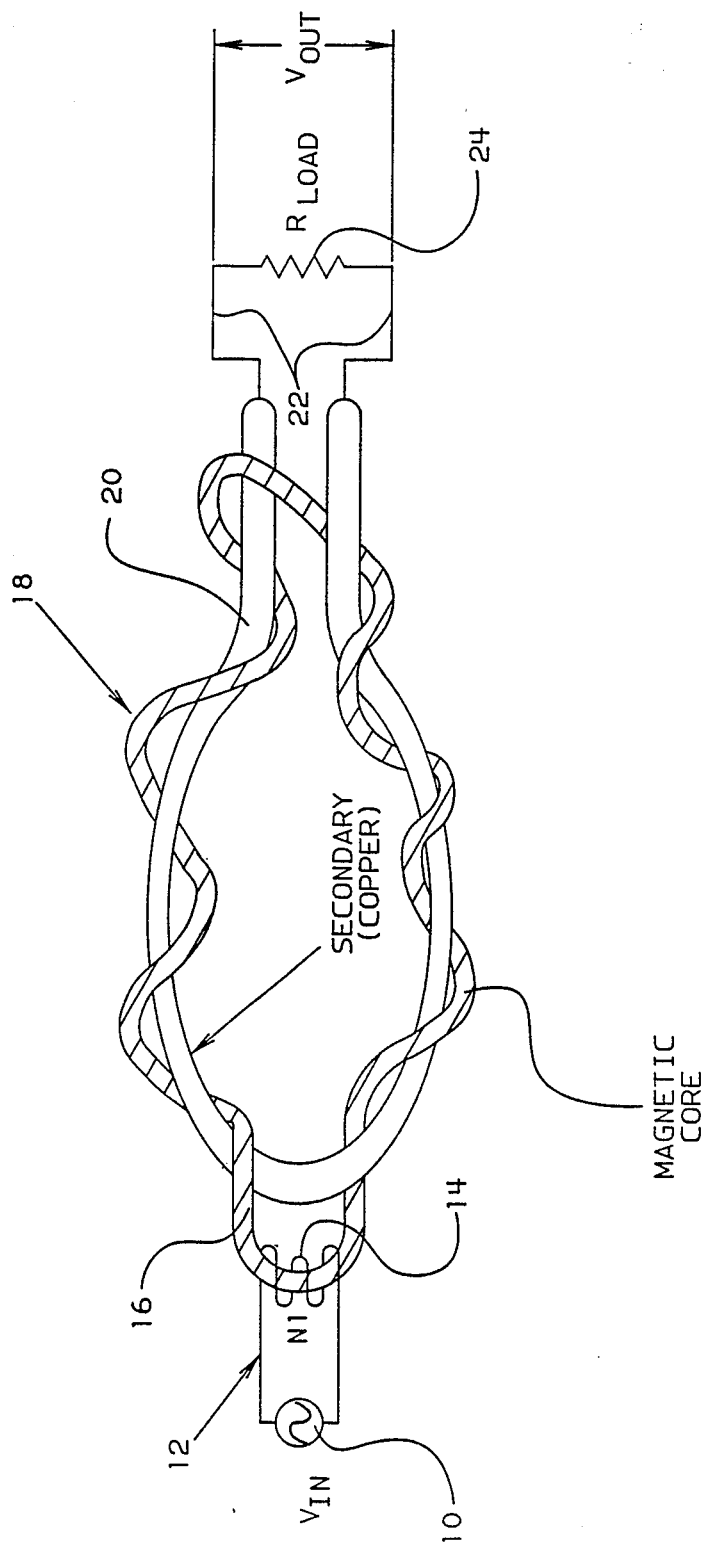
FIG. 1 is a schematic drawing of a transformer including a multi-turn magnetic core about a loop of conductor and associated circuit elements illustrative of a fundamental principle of the invention.

In high frequency operations, the cross-section of a transformer core is reduced compared to low frequency operation. However, in high current output circuits, the secondary winding of a transformer can be very thick and bulky. It is a feature of the present invention that in recognition of these facts, the core is wrapped around the secondary winding plural times at least partly in lieu of the secondary winding being wrapped around the core plural times. FIG. 1 shows this principle of operation. A voltage source 10 ($V_{in}$) is connected by a conductor 12 to a primary winding 14 of N1 turns wrapped around a portion of a shaped ferrite core 16. The magnetic core 16 has a plurality of turns 18 wrapped around a single turn secondary conductor 20, the output ends of which are connected via conductors 22 to a load 24 to deliver $V_{out}$ thereto.

The voltage seen at the output 24 is $V_{out} = (N2/N1) V_{in}$, where N1 equals the number of turns in the primary winding 14 and N2 equals the number of turns 18 of the ferrite core around the single turn secondary "winding" 20.

If the secondary winding 20 were of a different number of turns N3 (not shown), $V_{out}$ would equal N3 (N2/N1) $V_{in}$, N1 being the number of primary turns and N2 being the number of turns of the core around the secondary winding.

Figure 2:
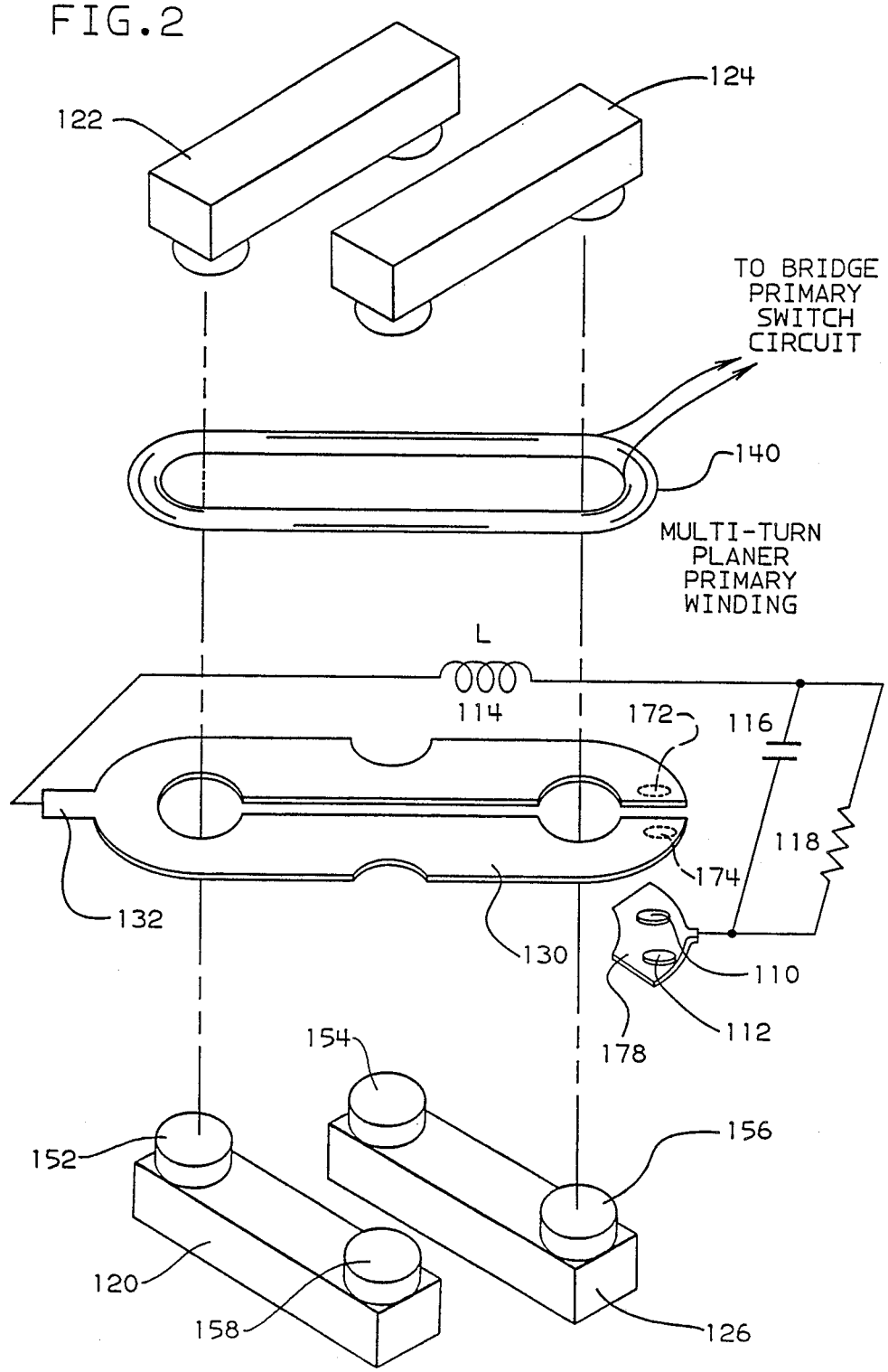
FIG. 2 is an exploded view of a transformer structure embodying electro magnetic principles shown and described with respect to FIG. 1 and further including a schematic showing of electrical components illustrative of a push-push output circuit which may be driven advantageously by the practical transformer.
Figure 3:
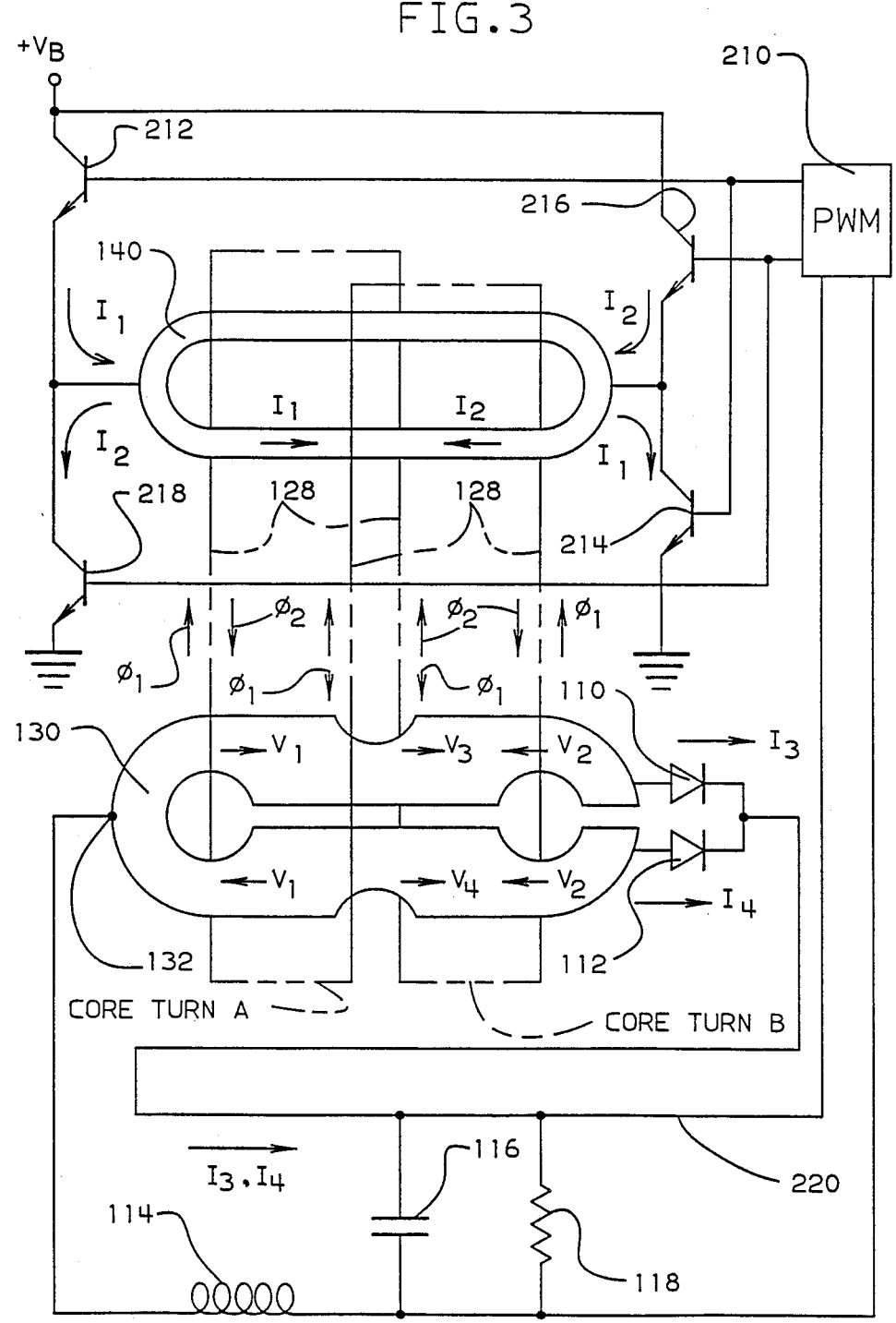
FIG. 3 is an electrical diagram of a voltage regulator of a full-bridge kind which includes the transformer structure and circuit elements shown in FIG. 2, in a pulse-width modulated full-bridge input, push-push output topology.

FIG. 2 is an exploded isometric view of a bridge transformer using a two-turn core, in accordance with the invention. FIG. 3 is an electrical and magnetic flux path diagram corresponding to the core and conductor arrangement of FIG. 2, and shows in addition, a full bridge drive circuit for the primary winding thereof. The rectifiers 110, 112, the output filter inductor 114, the capacitor 116, and the load 118 are all conventional output circuit elements insofar as their electrical function is concerned. The primary circuit, not shown in FIG. 2, could be a full bridge as in FIG. 3 or other suitable circuit for symmetric drive.

The core elements 120, 122, 124, 126 of FIG. 2, when assembled, form a single closed flux path (128, FIG. 3) which threads the secondary conductor loop 130 twice. The secondary conductor loop 130 encloses two core posts 152 and 156, excludes two core posts 154 and 158, and is of one plane. It connects to the output circuit through the rectifiers 110, 112 at one end, and through the center tap connection 132 at the other end. The rectifiers 110, 112 make contact with the bottom of 130 at the areas indicated by the dotted circles at 172, 174. The other rectifier contact is to conductor 178, which provides a bus connection to the external circuit. The details and advantages of this rectifier arrangement are described later. The primary winding 140 encloses the same core posts 152 and 156 as the secondary loop 130, and is of the same general shape as the secondary conductor 130. The winding 140 may be formed in pancake style, one conductor thick. The core elements 120, 122, 124, 126 mate at their core post faces to form a single continuous zig-zag shaped flux path twice linking the secondary 130 and providing a window to receive and link the primary winding 140.

FIG. 3 illustrates the operation of the structures of FIG. 2 in a full bridge driven, pulse width modulated, push-push output power supply. To simplify the figure, the entire flux path is represented by the line 128. A pulse width modulating (PWM) control 210 operates first and second pairs of transistor switches 212, 214 and 216, 218 to conduct alternately, first one pair and then the other. A bulk DC supply VB is connected via the first pair of transistor switches 212, 214 to pass, when 212 and 214 conduct, primary current I1, through the primary winding 140. This sets up flux $\phi$, in core turn A, and in core turn B in series therewith, thereby inducing a voltage V1 in each half of secondary 130, resulting in a current I3 in one half through diode 110.

A sense line 220 connects the output terminals at the load 118 to the PWM control 210. The PWM control can be any of many well-known kinds, such as free-running (demand) or oscillator driven, and will usually include a reference for comparison to the output voltage sensed via line 220. In any event, after a short (pulse) period, PWM control 210 turns the first pair of switches 212, 214 OFF and after a controlled delay turns the second pair 216, 218 ON to deliver a second current pulse I2 to the primary winding 140, in the direction opposite to the first current I1. This sets up flux $\phi 2$ in both core turns A and B of the magnetic circuit (defined by the core elements 120, 122, 124, 126 of the structure shown in FIG. 2). The increase of flux $\phi 2$ induces potentials V2 in both half turns of secondary 130. Diode 110 blocks one side but I4 flows in the other side, through diode 112 to the filter and load circuit elements 114, 116, 118.

Figure 4:
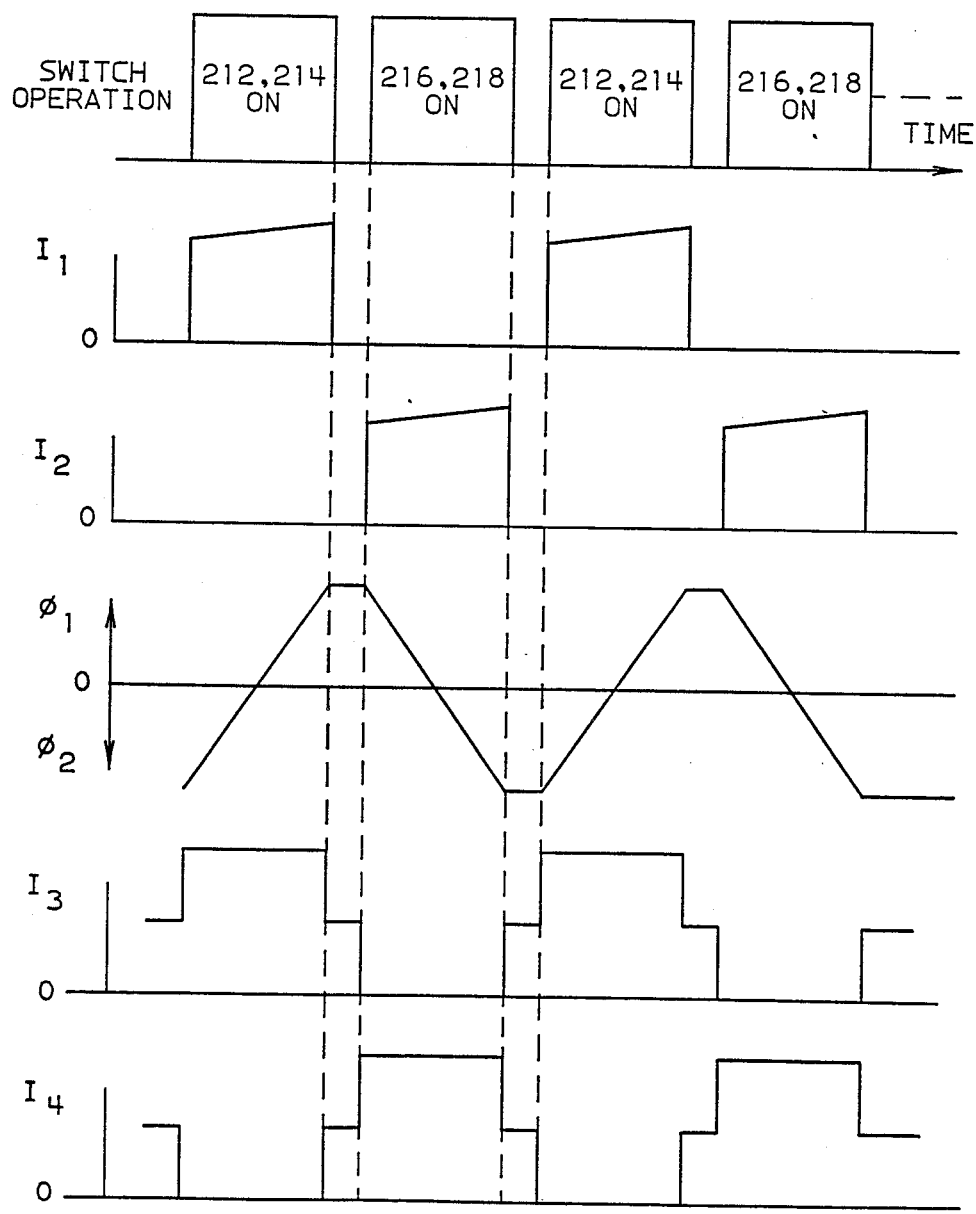
FIG. 4 is a timing diagram containing idealized waveforms illustrative of the operation of the regulator of FIG. 3.

FIG. 4 represents a typical timing diagram with idealized waveforms illustrative of the afore-described operation of the circuit of FIG. 3.

Figure 5:
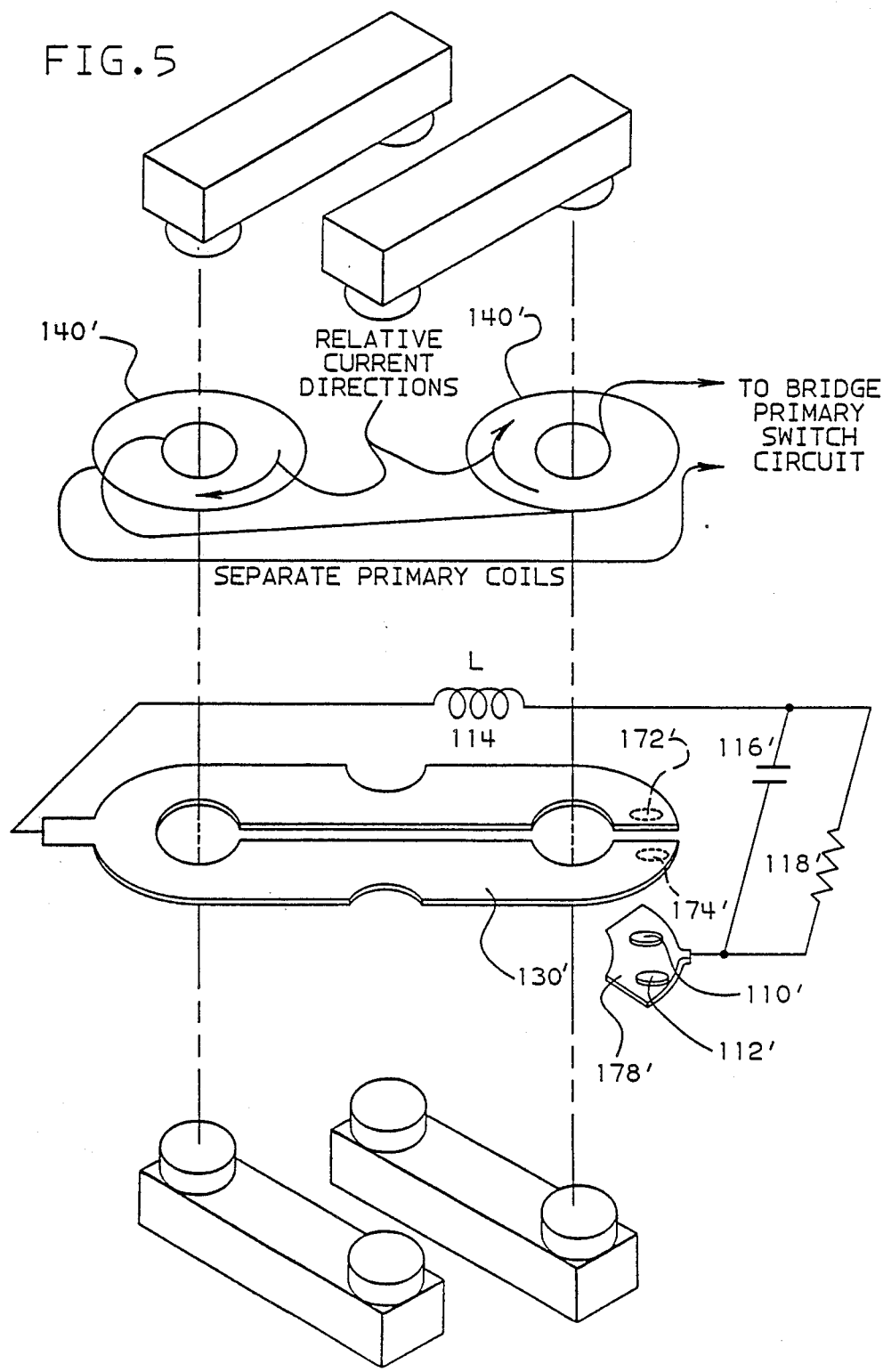
FIG. 5 illustrates an alternative configuration of the transformer of FIG. 2.

FIG. 5 shows a variation of the embodiment of FIG. 2, in which the primary winding consists of two separate coils 140', one around each core post enclosed by the secondary conductor loop 130'. The coils 140' may be wired in series or parallel to form the primary winding. In either case, they are preferably arranged such that their currents flow in the same sense, as shown for example by the clockwise arrows on the coils. The variation in FIG. 5 may provide more design flexibility compared to the structure in FIG. 2, but at the cost of increased leakage inductance.

In either bridge transformer variation, the rectifiers (110 and 112 in FIG. 2 or 110' and 112' in FIG. 5) may be mounted and connected conventionally, exterior to the transformer, or may be incorporated into the transformer. Incorporating them into the transformer allows the entire diode-diode commutate current loop to be constructed so that its geometry approximately matches the geometry of the primary winding current paths. This geometric match, combined with the close proximity of the primary coil(s) to the secondary structure, allows the primary current to nearly cancel the effects of the secondary commutate current during switch transitions, thus minimizing commutate loop inductance and allowing fast commutate times for high frequency operation.

Figure 6:
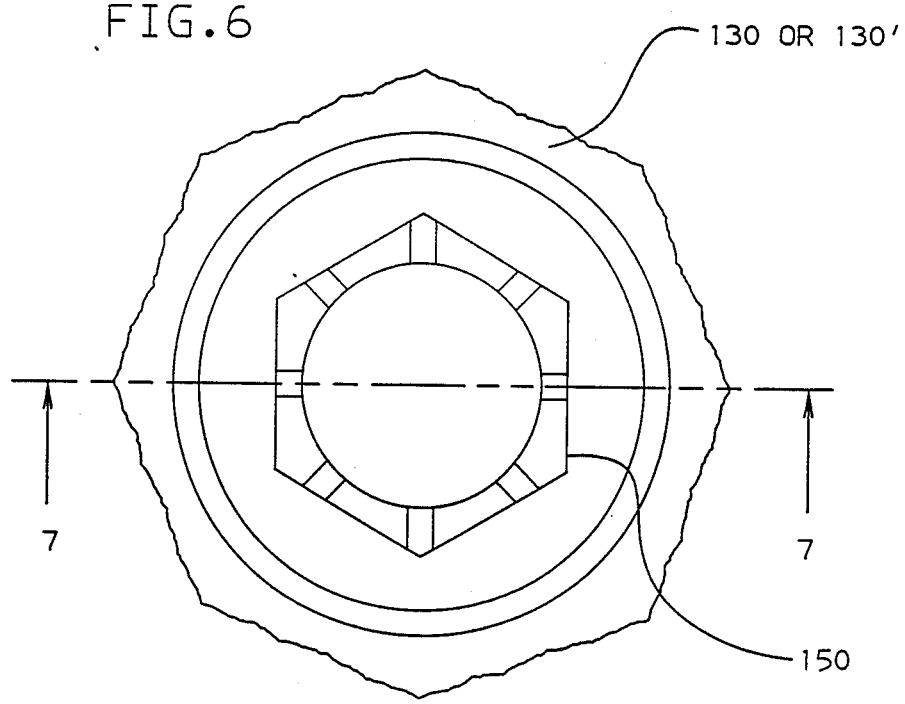
FIGS. 6 and 7 show a diode mount suitable for use in the structures of FIGS. 2 and 5, FIG. 7 being a cross-section taken on line 7—7 of FIG. 6.
Figure 7:
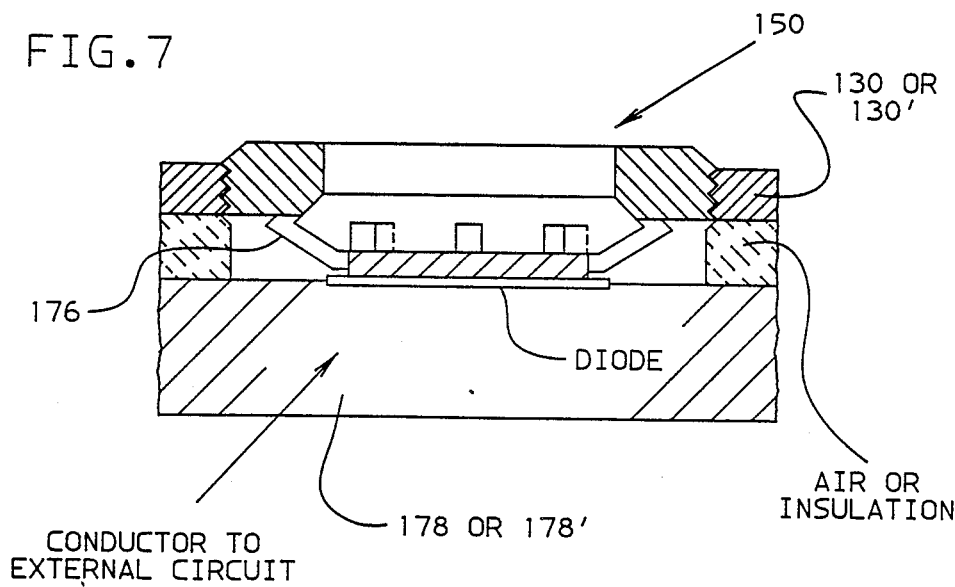

In the variant shown in FIGS. 6 and 7 the diodes 110, 112 of FIG. 2 (or 110', 112' of FIG. 5) are implemented as single chip devices in a package 150 received in the end portions 172, 174, 172', 174' of the secondary conductor loop 130 or 130', so as to reduce inductance of the diode to diode commutate current loop. The package includes a compliant conductive member 176 which holds the diode chip in contact with the respective conductor 178 or 178' by which the end portions 172, 174 or 172', 174' are connected to the external circuit. Further description of this kind of diode mount is given in an article entitled "Low Inductance Chip Connector for Power Rectifiers" published in the IBM Technical Disclosure Bulletin, Vol. 29, No. 3 (August, 1986) pages 1071-1072.

In either case, the bridge transformer embodies a two-turn core structure and associated "windings" which function as a magnetically tightly coupled power transformer suitable for inclusion in a switched mode power supply with a bridge type primary switch circuit. The transformer provides the conventional electrical terminals for such a circuit: two primary winding connections and three secondary connections (two "ends" and one center tap). Electrically, the function is equivalent to the function of a conventional power transformer in this application. However, the internal structure of the transformer is such that the secondary winding is mechanically very simple, while the core forms a magnetic flux path (turn A, turn B) which twice threads the secondary winding 130 or 130'.

The magnetic core elements of FIGS. 2, 3 and 5 are easily fabricated from ferrite or laminated iron or other suitable material, and can be made and mounted with tolerances whereby little or no gap occurs in the magnetic circuit, while the secondary 130 or 130', being of one piece, has no joints to introduce electrical resistance.

It will be seen that the various embodiments of the invention described in detail above employ the principle of a flux path having plural loops in series about a conductor structure. While voltage step-down transformers have been discussed in particular, the primary and secondary designations could be reversed to provide voltage step-up. Accordingly, it will be understood that the invention can be variously embodied within the spirit of the invention and the scope of the appended claims.

What is claimed is:

1. A transformer comprising, in combination;
    a core of magnetic material with four post segments and four link segments, arranged to form a single continuous flux path,
    said segments arranged so that the flux path comprises, in order, a first post, a first link, a second post, a second link, a third post, a third link, a fourth post and a fourth link,
    a secondary structure comprising a secondary conducting path,
    said secondary conducting path being connected to an external circuit via two end terminals and a center tap terminal,
    said secondary conducting path passing from the first of said end terminals, under said second link, over said first link, under said fourth link, and over said third link, to the second of said end terminals, thereby enclosing two of said four posts, and excluding the other two of said four posts,
    said center tap terminal located on the said secondary conducting path between said second post and said fourth post,
    a primary conducting path connected to an external circuit via two primary terminals, whereby currents in the turns of said primary conducting path additively produce flux in said single flux path.

2. A transformer as in claim 1 in which the said primary and said second conducting paths consist of planar windings.

3. A transformer as in claim 1 in which the said primary conducting path is a planar winding, said secondary structure being formed in a plane from a single conducting sheet.

4. A transformer as in claim 1 in which said primary conducting path and said secondary conducting path are of substantially identical shape and are positioned in close physical proximity to provide tight magnetic coupling.

5. A system in accordance with claim 1 wherein said structure includes planar rectifier diode components within said secondary conducting path whereby inductance in the circuit path from the first of said end terminals, through said diode components, to the second of said end terminals is minimized and commutating action of the diodes is facilitated.

* * * * *